United States Patent  
Italia et al.

(10) Patent No.: US 8,928,609 B2  
(45) Date of Patent: Jan. 6, 2015

(54) COMBINING TOUCH SCREEN AND OTHER SENSING DETECTIONS FOR USER INTERFACE CONTROL

(75) Inventors: Francesco Italia, Singapore (SG); Giuseppe Noviello, Singapore (SG); Chee Yu Ng, Singapore (SG); Benedetto Vigna, Potenza (IT)

(73) Assignees: STMicroelectronics International N.V., Amsterdam (NL); STMicroelectronics Asia Pacific Pte Ltd, Singapore (SG)

( * ) Notice: Subject to any disclaimer, the term of this patent is extended or adjusted under 35 U.S.C. 154(b) by 188 days.

(21) Appl. No.: 13/544,713

(22) Filed: Jul. 9, 2012

(65) Prior Publication Data  
US 2014/0009430 A1 Jan. 9, 2014

(51) Int. Cl.  
G06F 3/041 (2006.01)

(52) U.S. Cl.  
USPC .......................................... 345/173; 345/156

(58) Field of Classification Search  
USPC .......................... 345/173, 174, 175, 156, 169  
See application file for complete search history.

(56) References Cited

U.S. PATENT DOCUMENTS

| | | | |
|---|---|---|---|
| 7,948,478 B2 | 5/2011 | Chuang | |
| 2006/0279548 A1* | 12/2006 | Geaghan | 345/173 |
| 2011/0175832 A1* | 7/2011 | Miyazawa et al. | 345/173 |
| 2011/0291981 A1* | 12/2011 | Yang | 345/174 |
| 2011/0316888 A1* | 12/2011 | Sachs et al. | 345/667 |
| 2012/0050176 A1 | 3/2012 | Chin | |
| 2012/0188170 A1* | 7/2012 | Stedman et al. | 345/173 |

* cited by examiner

Primary Examiner — Duc Dinh  
(74) Attorney, Agent, or Firm — Gardere Wynne Sewell LLP

(57) ABSTRACT

A touch sensitive display includes a capacitive touch sensor configured to output capacitance values. A motion sensor makes a motion detection and generates a motion signal including a motion value indicative of sensed motion detection. A touch detection circuit is coupled to receive the capacitance values and motion values. The touch detection circuit processes the capacitance values to make a hovering detection and a touching detection with respect to the display. The touch detection circuit further generates an output signal including the motion value correlated in time with each of the hovering detection and touching detection. The output signal may be processed as a user interface control signal. The output signal may also be processed to determine an impulsive strength of the touching detection as a function of an elapsed time between hover and touch and the measured motion values.

31 Claims, 1 Drawing Sheet

COMBINING TOUCH SCREEN AND OTHER SENSING DETECTIONS FOR USER INTERFACE CONTROL

TECHNICAL FIELD

The present invention relates to electronic systems that include both a touch screen sensor and one or more other motion sensors (such as, for example, an accelerometer, a gyroscope, a direction sensor, a pressure sensor, a location (for example, GPS) sensor, and the like) and, in particular, to a method and apparatus for combining the sensed outputs from the touch screen sensor and one or more other motion sensors for user interface control.

BACKGROUND

A number of electronic devices are known in the art which utilize a touch screen for the user interface. For example, laptop computers, tablet computers, handheld gaming devices and mobile telephones (specifically, smart phones) conventionally include a display screen which incorporates a touch screen user interface.

The provision of motion sensing circuitry in such electronic devices is also well known. Exemplary motion sensors include one or more of an accelerometer (for acceleration detection), a gyroscope (for orientation detection), a compass/magnetometer (for direction detection), a location (for example, GPS) sensor (for location detection), a pressure sensor (for elevation detection), and the like. These motion sensors may provide an additional means for enabling the user to interface with the device and in particular control execution of applications running on the device or services provided by the device.

Published United States Application for Patent No. 2012/0050176 (Mar. 1, 2012) to Chin discloses an electronic computing device with a touch sensitive display screen and an accelerometer. A touch signal (obtained from the touch sensitive display screen) and an acceleration signal (obtained from the accelerometer) are processed by a processor of the electronic computing device to provide combined user interface control signaling which is indicative of not only the location on the screen at which a touch is made, but also an impact of that touch. A higher level application being executed by the processor is responsive to the combined user interface control signaling. A specific example provided by Chin relates to a musical instrument application (specifically a piano) and the use of the combined user interface control signaling to specify the particular key that has been struck (touching detection) along with an indication of impact to modify the audible volume of the note tone which corresponds to the struck key (acceleration detection).

Chin further notes that the acceleration signal contribution to the combined user interface control signaling is adversely dampened if one or more other fingers are simultaneously resting on the touch sensitive display screen. To address this problem, Chin teaches the scaling of the acceleration signal contribution as a function of a distance between the position of the currently sensed touch and the position of one of the other fingers that are simultaneously resting on the touch sensitive display screen. The calculated scaling factor is then applied to further modify the audible volume.

There is a need in the art for an improved means for generating the combined user interface control signaling from a touch screen sensor and one or more other motion sensors for user interface control.

SUMMARY

The present invention is directed to method and apparatus for combining in a signal a touch screen display system hover (or proximity) detection indication correlated in time with a sensed motion value and further combining in another signal a touch screen display system touching detection indication correlated in time with a sensed motion value. The signals are processed as user interface control signals. The signals are further processed to make a determination of an impulsive strength of the detected touch. The impulsive strength determination is calculated as a function of an elapsed time between the hovering (proximity) detection and the touching detection and the motion values. In an implementation, error in the motion value correlated in time with the touching detection is corrected by subtracting the motion value correlated in time with hovering (proximity) detection.

In an embodiment, a system comprises: a touch sensitive display including a capacitive touch sensor configured to output values indicative of sensed capacitance; a motion sensor configured to make a motion detection and generate a motion signal including a motion value indicative of sensed motion detection; and a touch detection circuit coupled to the capacitive touch sensor and the motion sensor, the touch detection circuit configured to process the values indicative of sensed capacitance and make at least one of a hovering detection and a touching detection, the touch detection circuit further configured to generate an output signal including the motion value correlated in time with a detection indication of the at least one hovering detection and touching detection.

In an embodiment, a method comprises: sensing a hovering over a location of a touch sensitive display; sensing a touching of the location of the touch sensitive display; sensing a motion value; and generating an output signal including the motion value correlated in time with an indication of each of the sensed hovering and sensed touching.

In an embodiment, a circuit comprises: a motion sensor configured to make a motion detection and generate a motion signal including a motion value indicative of sensed motion detection; a touch circuit configured to make a hovering detection with respect to a touch sensor and make a touching detection with respect to the touch sensor with a location detection; and a first processing circuit configured to generate a first output signal including a first motion value correlated in time with the hovering detection and a second output signal including a second motion value correlated in time with the touching detection.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
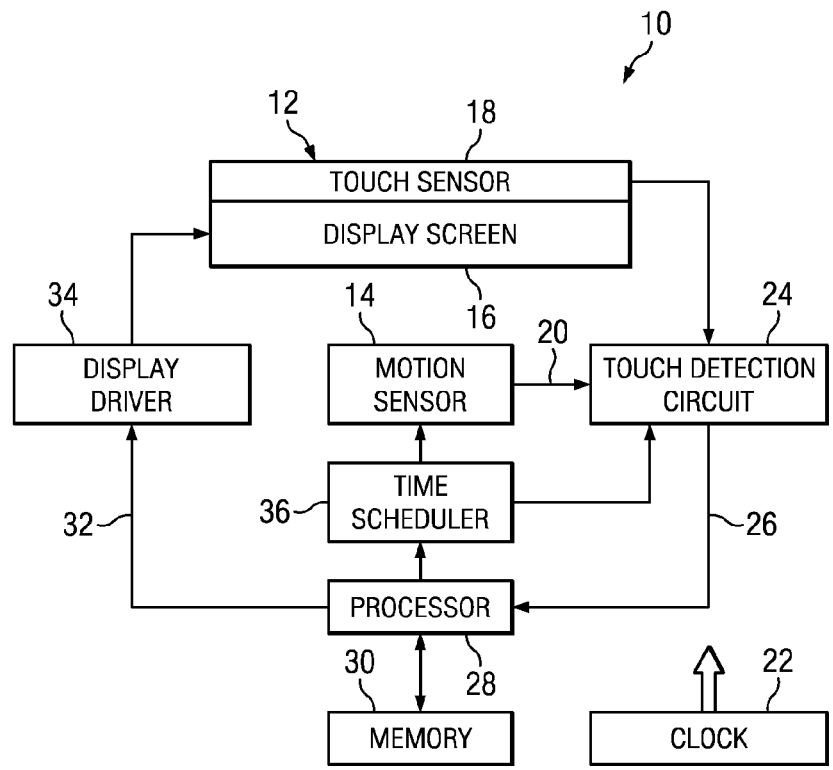
FIG. 1 is a block diagram of an electronic computing device including a touch sensitive display screen and at least one motion sensing circuit.

Reference is now made to FIG. 1 which shows a block diagram of an electronic computing device 10 including a touch sensitive display device 12 and at least one motion sensing circuit 14.

The touch sensitive display device 12 comprises a display screen 16 and an overlying touch sensor 18. The display screen 16 may be of the LED, AMOLED, LCD, plasma, or the like, type. The touch sensor 18 is preferably of the capacitive type. The configuration and operation of such touch sensitive display device 12 is well known to those skilled in the art.

The motion sensing circuit 14 operates to make a motion sensing detection and provide an output signal 20 indicative of such detection. The motion sensing circuit 14 may comprise any one or more motion sensors known in the art. Examples of motion sensing circuits 14 that could be used include an accelerometer, a gyroscope, a direction sensor (compass/magnetometer), a location sensor (for example, GPS), a pressure sensor, and the like. The motion sensing circuit 14 may operate responsive to a clock signal output from a system clock 22, or a control signal output from a controller or processor circuit, by sampling and outputting detected motion information in response thereto. Alternatively, the motion sensing circuit may output the detected motion information in response to a received request signal. The output signal 20 includes motion information corresponding to the type of motion sensing circuit 14 used (for example, x, y and/or z acceleration and/or force measurement output from an accelerometer, pitch, yaw and roll orientation information in connection with a gyroscope, directional orientation in connection with a compass, elevation in connection with a pressure sensor, and coordinate location in connection with a location sensor). That motion information is preferably output from the motion sensing circuit 14 on a periodic basis in accordance with the clock or control signal.

The electronic computing device 10 further comprises a touch detection circuit 24 (also known in the art as a touch screen controller circuit). The touch detection circuit 24 is operable to make detections of touch activity on the touch sensor 18 based on sense signals (such as voltage signals having values corresponding to sensed capacitance value) output from the touch sensor 18. The touch sensor 18 is generally configured as a sensor array, and the touch detection circuit 24 functions to scan the sensor array to detect sensed capacitance values as well as detect changes in sensed capacitance values which are indicative of an actual touch made by a body part (or control instrument such as a stylus) on the touch sensor 18. In more sophisticated touch sensor 18 and touch detection circuit 24 operations, the scanning of the sensor array to detect sensed capacitance values as well as detect changes in sensed capacitance values includes processing by the touch detection circuit 24 of sensed capacitance values to provide an indication of touch proximity (referred to in the art as a "hovering" or "proximity" detection) in situations where a body part or instrument (such as a stylus) has approached close to the touch sensor 18 but has not yet made contact. As described herein, the terms "hover" or "hovering" detection will be understood to encompass any form of proximity detection made by the touch sensor 18 and touch detection circuit 24 and the term "touch" or "touching" detection will be understood to encompass any form of a physical contact detection made by the touch sensor 18 and touch detection circuit 24.

The touch detection circuit 24 generally operates in a frame scanning mode responsive to a clock signal output from a system clock 22. Each frame scan comprises a sensing of the capacitance at individual locations in the sensor array of the touch sensor 18. The sensed capacitance information is processed by the touch detection circuit 24 to make touching and/or hovering detections, calculate the location of such touching and/or hovering detections and provide an output signal 26 containing that information. The touch detection circuit 24 further functions to read the signal 20 output from the motion sensing circuit 14 at least once each frame and include the motion information provided by the motion sensing circuit 14 with the touching and/or hovering information generated by the touch detection circuit 24. In this way, the output signal 26 includes time correlated or time coherent (by frame) motion and touching/hovering information. The touch detection circuit 24 may further include in the signal 20 information indicative of a time stamp for the motion and touching/hovering information.

The motion sensing circuit 14 and touch detection circuit 24 may, in an embodiment, be provided as a single integrated circuit chip.

The electronic computing device 10 further comprises a central processor 28 that receives and processes the output signal 26. The processor 28 has access to a memory 30 which may store the time correlated motion and touching/hovering information. The memory 30 further stores application programming executed by the processor 28. The time correlated motion and touching/hovering information is processed by the processor 28 as user interface control signaling in the context of processor execution of the application program. The user interface control signaling may take the place of or otherwise supplement conventional keypad entry and/or mouse control signaling of the computing device 10.

The motion sensing circuit 14, touch detection circuit 24 and processor 28 may, in an embodiment, be provided as a single integrated circuit chip.

Signals 32 output from the processor 28 are applied to a display driver circuit 34 which controls in a manner well known to those skilled in the art the display of information on the display screen 16 of the touch sensitive display device 12. The display driver may be integrated with the processor 28 in some system applications.

In some implementations, a time scheduling circuit 36 may be provided, either within the processor 28 or operable under processor control, to synchronize the operation of the motion sensor 14 and touch detection circuit 24 such that the information provided in the output signal 26 is time correlated. The time scheduling circuit 36 may further provide time stamping information for inclusion in the signal 26.

Figure 2:
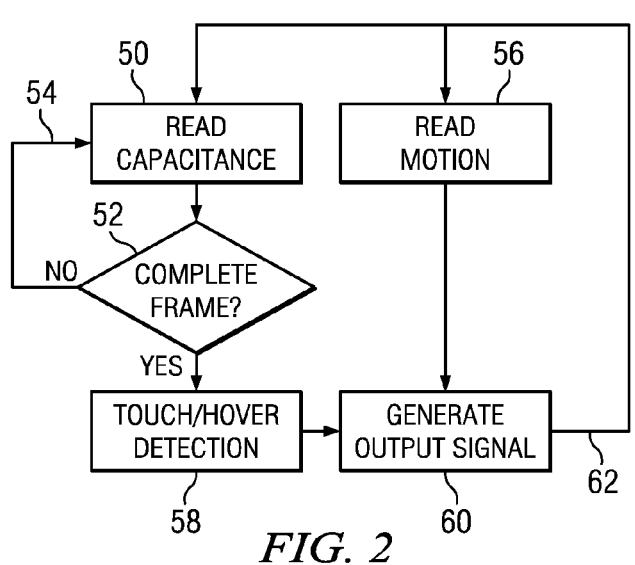
FIG. 2 is a flow diagram of a basic operation of the electronic computing device in FIG. 1.

Reference is now made to FIG. 2 which shows a flow diagram of a basic operation of the electronic computing device 10 in FIG. 1. In step 50, the touch detection circuit 24 reads capacitance information from the touch sensor 18. A determination is then made in step 52 as to whether a complete frame of capacitance information has been read. If not, the process returns in step 54 to step 50. Either during the loop which reads capacitance information from the touch sensor 18, or upon completion of a reading of a complete frame of capacitance information (Yes in step 52), the touch detection circuit 24 further reads motion information from the motion sensing circuit 14 in step 56. At least one read of the motion sensing circuit 14 is made per frame of capacitance information collected. Next, in step 58 the complete frame of capacitance information is processed to make touching and/or hovering detections and calculate the location in the touch sensor 18 of such touching and/or hovering detections. The output signal 26 is then generated in step 60 which includes both touch sensing (touching and/or hovering) position information and motion sensing information. The correlation in time for the reading of capacitance information and the reading of motion information ensures that the touch detection circuit 24 produces time coherent information in the output signal 26 that is a combination of both the touch sensing (touching and/or hovering) information and motion sensing information. The process then returns in step 62 to repeat the touch and motion sensing detection operations for a next frame.

The output signal 26 may comprise raw touch and motion sensing detection information. Such raw data would include, for each frame, the screen location of each touching and/or hovering detection and the value of the motion information. Alternatively, the touch detection circuit 24 may include programming or processing functionality to provide output signal 26 having a format and data content which is indicative of a logical and/or mathematical (algorithmic) combination of the touching and/or hovering detection information and the motion information. An advantage of the producing the latter type of signal is that the initial processing of the touching and/or hovering detection information and the motion information is removed from the processor 28.

The motion sensing circuit 14 may comprise one or more different types of sensor circuits, and thus the output signal 20 may correspondingly comprise one or more different types of motion information. The read motion information from each included motion sensor will be included in the output signal 26 correlated in time with the touch sensing (touching and/or hovering) position information.

In a number of applications, such as the musical instrument application discussed by the Chin reference identified above, it is important to detect not only the location of the touch made to the touch sensor 18, but also the impulsive strength of the detected touch. In this context, it will be understood that impulsive strength is not the same thing as applied pressure of the touch. Rather, impulsive strength is a combined measure of the speed and force of touch taken at the moment of impact.

The force of the touch can be detected through use of the motion sensor 14 and is indicated by the motion values and in particular the motion values that is correlated in time with the detected touch. For example, the motion sensor 14 may comprise an accelerometer whose output signal provides an indication of impact force of the touch in the x, y and z axes. If the device 10 is oriented properly, detection can be resolved to the force applied in only one axis (for example, the z axis). However, if the orientation of the device 10 cannot be controlled, then the applied force can be calculated from a mathematical combination of the individual force measurements made in all three axes. Those skilled in the art understand how to calculate this force from accelerometer signal outputs.

The touch detection circuit 24, as discussed above, is operable to scan the sensor array of the touch sensor 18 for changes in capacitance which are indicative of an actual touch of the touch sensor 18. This detection of the touch can be correlated in time to the signals output from the motion sensor 14 so as to associate each detected touch with sensed (and calculated) impact force. This does not, however, provide sufficient information for making the impulsive strength determination. Again, impulsive strength is a measure of both the speed and force of touch at the moment of impact, and thus additional information concerning touch speed is needed.

To make the touch speed determination, the device 10 takes advantage of the more sophisticated functionality of the touch sensor 18 and touch detection circuit 24 to detect an indication of touch proximity (i.e., a "hovering" or "proximity" detection). The touch sensing information for a given frame may be processed to detect an instance of a hovering over the touch sensor 18 at a location. As is known to those skilled in the art, the detected capacitance value associated with a hover is proportional to distance of the body part or instrument from the touch sensor 18. If the touch sensing information for a subsequent frame is processed to detect an instance of an actual touching of the touch sensor at (or very near to) that same location, the speed of the detected touch may be calculated based on the well known distance=rate×time formula, where the distance value is either a fixed value or set as a function of the measured hover capacitance, and the time value is the difference in clock (or time stamp values) between the hovering detection frame and the touching detection frame.

Figure 3:
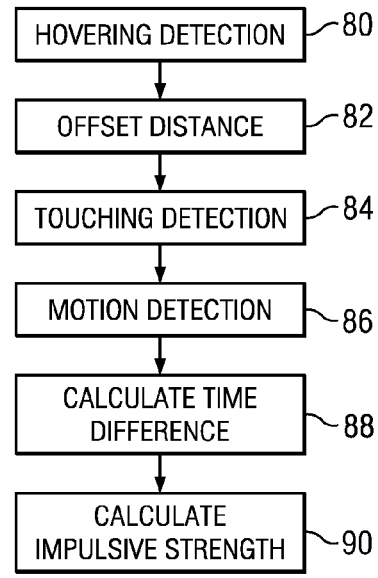
FIG. 3 is a flow diagram for a process to make impulsive strength determination.

Reference is now made to FIG. 3 which shows a flow diagram for a process to make the impulsive strength determination. In step 80, a hovering detection is made. This hovering detection may, for example, be made using the steps 50, 52, 54 and 58 of FIG. 2. In one embodiment, the capacitance value for the location of the detected hovering is processed in step 82 to determine an offset distance between the hovering body part or control instrument and the touch sensor 18. In another embodiment, the hovering detection of step 80 is not made until a certain capacitance value is detected. This certain capacitive value acts as threshold for making the hovering detection, and that certain capacitive value threshold further has an assigned or known offset distance in step 82. Next, in step 84, a touching detection is made. This touching detection may, for example, be made using the steps 50, 52, 54 and 58 of FIG. 2. Coincident in time (i.e., in the same or nearly the same frame as the touching detection), a motion detection is made in step 86 to obtain a motion value. The motion detection may be made using step 56 in FIG. 2. A calculation is then made in step 88 of the difference in time between the hovering detection of step 80 and the touching detection of step 84. This calculation may be made based on the difference in clock or time stamp values between the hovering detection frame and the touching detection frame. Lastly, in step 90, the impulsive strength calculation is made from the value of the motion detection (from step 86) and the speed of the touch calculated from the offset distance (of step 82) divided by the time (of step 88).

Although not explicitly shown in FIG. 3, the motion detection made in step 86 to obtain a motion value can also be performed coincident in time (i.e., in the same or nearly the same frame) as the hovering detection (step 80) to obtain a motion value for the hovering detection. This motion value, because no touch is concurrently occurring, may be indicative of noise (or background signal) in the motion sensor, and this error value can be subtracted from the motion value (step 86) correlated in time with the touching detection (step 84) to provided for error correction of that motion value at impact.

The foregoing operation may be summarized as follows: a) speed of the touch is detected as a function of the difference in clock time or time stamp value between detection of the hover and detection of the touch; b) a value indicative of impact of the touch is detected as a difference the motion sensor output signals (for example, accelerometer measurement) at the moment of the detected touch and moment of detected hover; and c) the speed of the touch and change in motion sensor output can be mathematically combined, as a sum or as a product, to provide a value which is indicative of the impact strength.

A more detailed description of a preferred implementation of the process of FIG. 3 is now provided. First, a detection of a hovering body part (such as a finger) or instrument (such as a stylus) is made by the touch sensor 18 and touch detection circuit 24 (step 80, FIG. 3). This hovering detection further implicates a simultaneous reading of the motion sensor 14 through output signal 20 to obtain a baseline (background or noise) value for motion sensing (compare to step 86, FIG. 3). It will be recalled from the discussion of FIGS. 1 and 2, that the output signal 26 from the touch detection circuit 24 will include both the touch sensing (in this case, hovering) position information along with the motion sensor output time correlated with a given initial frame associated with the hovering detection. The hovering detection is made by the touch sensor 18 and touch detection circuit 24 as a function of the sensitivity of the sensing operation. In other words, a hovering detection will not be indicated by the touch detection circuit 24 in output signal 26 until the approaching body part (such as a finger) or instrument (such as a stylus) reaches a certain distance from the touch sensor 18 corresponding to a threshold capacitance. That certain distance for hovering detection is, for example, the offset distance of step 82, FIG. 3.

Next, a detection of a touching body part (such as a finger) or instrument (such as a stylus) is made by the touch sensor 18 and touch detection circuit 24 (step 84, FIG. 3). This touching detection further implicates a simultaneous reading of the motion sensor 14 through output signal 20 to obtain a touch value for motion sensing (step 86, FIG. 3). It will again be recalled from the discussion of FIGS. 1 and 2, that the output signal 26 from the touch detection circuit 24 will include both the touch sensing (in this case, touch) position information along with the motion sensor output time correlated with a given subsequent frame associated with the touching detection.

The difference between the motion value for touching detection and the baseline (background or noise) motion value for hovering detection provides a motion impact detection value (step 86, FIG. 3).

The difference in time or timestamp value between the given subsequent frame (associated with the touching detection) and the given initial frame (associated with the hovering detection) provides the calculated time difference (step 88, FIG. 3). As the certain distance for hovering detection (the offset distance of step 82, FIG. 3) can have an assumed value inside a certain limit (with a certain degree of error depending on external conditions) for all hovering/touching detections based on sensor characteristics and the sensing environment, the calculated time difference accordingly has a value which is indicative of the speed of body part (finger) impact. Alternatively, the speed value can be calculated directly by dividing the calculated time by the offset distance for the hovering detection.

An estimate of the impulsive strength of impact can then be calculated as a mathematical function of the motion impact detection value (i.e., variation in sensed value output from the motion sensor 14) and speed of impact (i.e., difference in frame clock time or time stamp value). As an example, the value for impact strength (IS) may be calculated by multiplying the motion impact detection value (A) by the speed of impact (S). Appropriate normalizing factors may need to be applied to the motion impact detection value and speed of impact value. The normalizing factors may have to be empirically calculated. Thus, the impact strength (IS) calculation may comprise:

$$IS=(k1*S)*(k2*A);$$

wherein: $S=d/(Ttouch-Thover)$;
wherein: Ttouch is the frame time of the touching detection,
Thover is the frame time of the hovering detection, and
d is the hovering detection distance; and
$A=Mtouch-Mhover$;
wherein: Mtouch is the motion sense value at the touching detection and
Mhover is the motion sense value at the hovering detection.

In a preferred implementation, the motion sensor 14 comprises an accelerometer. The touch detection circuit 24 of the system 10 accordingly functions to fuse the sensed touch/hover/location information from the touch sensor 18 with the sensed acceleration information from the motion sensor 14 (in any one or more the x, y and z axes) into the output signal 26 in a time correlated manner. With such time correlation, the processor 28 can not only detect instances of a touch made to the touch sensitive display device 12 but also detect information indicative of the impulsive strength of impact of that touch. This combined information provides for an enhanced user interface control with respect to an application being executed by the processor. For example, with a piano application, the combined information will identify the particular piano key that has been struck so as to select a tone to be produced and further identify impulsive strength with which that piano key has been struck so as to control the volume of the tone being produced.

In another implementation, the motion sensor 14 comprises a gyroscope. The touch detection circuit 24 of the system 10 accordingly functions to fuse the sensed touch/hover/location information from the touch sensor 18 with the sensed device 10 orientation information from the motion sensor 14 into the output signal 26 in a time correlated manner. With such time correlation, the processor 28 can perform certain actions based on the combination of sensed touch or hover along with sensed device orientation. For example, the device orientation information from the motion sensor 14 can be used by the processor to control how objects are being displayed by the driver 34 on the screen 16, while the touch/hover/location information from the touch sensor 18 can be used by the processor to control selection of the displayed objects. More specifically, while the device orientation information is used to control display of objects, a detected hover may indicate zooming operation while a detected touch would act on the zoomed object.

Take for example, a map based application executed by the processor 28 on a mobile device (such as a smart phone). The device location information (from a GPS motion sensor) and orientation information (from a compass sensor) taken at a same point in time would serve to provide location and orientation motion information for the mobile device such that the map is displayed on screen 16 correlated in time and correctly oriented to the view of the user holding the mobile device. The touch/hover/location information from the touch sensor 18 would serve to indicate the user's interest in a certain part of the map. A hovering detection at a given location on the map may cause the processor to zoom into that location (providing additional geographic detail) or provide more specific information concerning that location (such as an address and business name). A touching detection at that location on the map may cause the processor to activate additional features such as opening the website of the business or calling the phone number of the business.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system, comprising:
   a touch sensitive display including a capacitive touch sensor configured to output values indicative of sensed capacitance;

a motion sensor configured to make a motion detection and generate a touching detection correlated motion signal and a baseline detection motion signal, each including a motion value indicative of the sensed motion detection;

a touch detection circuit coupled to the capacitive touch sensor and the motion sensor, the touch detection circuit configured to process the values indicative of sensed capacitance and make a hovering detection and a touching detection, wherein the hovering detection is correlated with the motion value of the baseline detection motion signal and the touching detection is correlated with the motion value of the touching detection correlated motion signal; and wherein the touch detection circuit further configured to generate an output signal including each of the motion value correlated in time with a detection indication of the at least one hovering detection and touching detection and the values indicative of sensed capacitance and an impulsive strength determined from the correlated motion value of the baseline detection motion signal and the correlated motion value of the touching detection correlated motion signal.

2. The system of claim 1, further comprising a processing circuit coupled to the touch detection circuit, said processing circuit configured to execute an application program and process the output signal as a user interface control for the executing application program.

3. The system of claim 1, further comprising a processing circuit coupled to the touch detection circuit, said processing circuit configured to determine the impulsive strength.

4. The system of claim 3, wherein the processing circuit determines the impulsive strength by determining a speed of touch impact on the touch sensitive display.

5. The system of claim 4, wherein the processing circuit determines the speed of touch impact as a function of an elapsed time between a detected hovering over the touch sensitive display and the detected touch of the touch sensitive display.

6. The system of claim 5, wherein the impulsive strength is calculated by the processing circuit as a mathematical combination of the elapsed time and the motion detection.

7. The system of claim 6, wherein the motion sensor further comprises an accelerometer and the motion value is an acceleration value.

8. The system of claim 2, wherein the motion sensor is an orientation sensor and the motion signal is indicative of sensed orientation, and further comprising a processing circuit coupled to the touch detection circuit, said processing circuit configured to control display of information on the touch sensitive display in response to the sensed orientation and at least one hovering detection and touching detection.

9. The system of claim 1, wherein the motion sensor is an accelerometer and the motion values of the baseline detection motion signal and touch detection correlated motion signal are acceleration values.

10. The system of claim 1, wherein the motion sensor is a gyroscope and the motion values of the baseline detection motion signal and touch detection correlated motion signal are orientation values.

11. The system of claim 1, wherein the motion sensor is a location sensor and the motion values of the baseline detection motion signal and touch detection correlated motion signal are location coordinates.

12. The system of claim 1, wherein the motion sensor is a direction sensor and the motion values of the baseline detection motion signal and touch detection correlated motion signal are compass directions.

13. The system of claim 1, wherein the motion sensor is a pressure sensor and the motion values of the baseline detection motion signal and touch detection correlated motion signal are elevation values.

14. A method, comprising:
sensing a hovering over a location of a touch sensitive display using a capacitive touch sensor outputting values indicative of sensed capacitance;
sensing a touching of the location of the touch sensitive display using the capacitive touch sensor;
sensing a touch detection motion signal correlated in time with the sensed touching and a baseline detection motion signal correlated with the sensed hovering;
generating an output signal computed from a motion value from the touch detection motion signal and a motion value from the baseline detection motion signal; and
determining an impulsive strength including the differences between the motion value from the touch detection motion signal and the motion value from the baseline detection motion signal.

15. The method of claim 14, further comprising:
executing an application program; and
processing the indication and motion values from the output signal as a user interface control for the executing application program.

16. The method of claim 14, wherein determining the impulsive strength further comprises determining a speed of touch impact on the touch sensitive display.

17. The method of claim 16, wherein determining the speed of touch impact comprises determining an elapsed time between a sensed hovering over the touch sensitive display and the sensed touch of the touch sensitive display.

18. The method of claim 17, wherein determining the impulsive strength comprises mathematically combining the elapsed time and motion value.

19. The method of claim 18, wherein the motion values further include acceleration values.

20. The method of claim 17, further comprising correcting for error in the motion value by subtracting the motion value from the baseline detection motion signal from the motion value from the touch detection motion signal.

21. The method of claim 15, wherein the motion values are indicative of sensed orientation, and further comprising controlling a display of information on the touch sensitive display in response to the sensed orientation and said sensed hovering and said sensed touching.

22. The method of claim 14, wherein the motion values are acceleration values.

23. The system of claim 14, wherein the motion values are orientation values.

24. The system of claim 14, wherein the motion values are location coordinates.

25. The system of claim 14, wherein the motion values are compass directions.

26. The system of claim 14, wherein the motion values are elevation values.

27. A circuit for a touch sensitive display, comprising:
a motion sensor configured to make a motion detection and generate a motion signal including a motion value indicative of sensed motion detection;
a touch sensor configured to make a hovering detection and make a touching detection with respect to the touch sensor with a location detection, wherein the hovering detection is correlated in time with a hover correlated motion signal and the touching detection is correlated in time with a touch correlated motion signal;

a first processing circuit configured to generate a first output signal including the motion value of the hover correlated motion signal and a second output signal including the motion value of the touch correlated motion signal correlated in time with the touching detection;

wherein the hovering detection is correlated with the motion value of the hovering detection correlated motion signal and the touching detection is correlated with the motion value of the touching detection correlated motion signal; and wherein the first output signal provides motion value information for determining an impulsive strength determined from the correlation motion value of the hovering detection correlated motion signal and the motion value of the touching detection correlated motion signal.

28. The circuit of claim 27, further comprising a second processing circuit configured to process the first and second output signals and generate corresponding user interface control signals.

29. The circuit of claim 27, further comprising a second processing circuit configured to process the first and second output signals and determine the impulsive strength of the sensed touching detection.

30. The circuit of claim 29, wherein the second processor is configured to determine an elapsed time between the sensed hovering detection and the sensed touching detection and calculate the impulsive strength of the sensed touching detection as a function of the elapsed time and the motion value.

31. The circuit of claim 30, wherein the second processor is further configured to correct for error in the second output signal by subtracting the motion value of the hover correlated motion signal from the motion value of the touch correlated motion signal for calculating the impulsive strength.

* * * * *